United States Patent
Hara

(10) Patent No.: US 8,294,727 B2
(45) Date of Patent: Oct. 23, 2012

(54) METAINFORMATION ADD-ON APPARATUS, IMAGE REPRODUCING APPARATUS, METHODS OF CONTROLLING SAME AND PROGRAMS FOR CONTROLLING SAME

(75) Inventor: Toshita Hara, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 1304 days.

(21) Appl. No.: 11/790,622

(22) Filed: Apr. 26, 2007

(65) Prior Publication Data

US 2007/0252847 A1 Nov. 1, 2007

(30) Foreign Application Priority Data

Apr. 28, 2006 (JP) ................................ 2006-124869

(51) Int. Cl.
G09G 5/02 (2006.01)
G09B 11/10 (2006.01)
G09B 19/00 (2006.01)
G09B 1/00 (2006.01)

(52) U.S. Cl. ............. 345/589; 434/84; 434/98; 434/170

(58) Field of Classification Search .................... 346/46; 434/81, 98, 170, 207, 84; 345/589
See application file for complete search history.

(56) References Cited

U.S. PATENT DOCUMENTS

| | | | | |
|---|---|---|---|---|
| 5,797,397 A * | 8/1998 | Rosenberg | ............... | 600/400 |
| 6,216,123 B1 * | 4/2001 | Robertson et al. | ............... | 1/1 |
| 7,028,050 B1 * | 4/2006 | Rose | ............... | 1/1 |
| 7,258,614 B1 * | 8/2007 | Kates et al. | ............... | 463/42 |
| 7,274,822 B2 * | 9/2007 | Zhang et al. | ............... | 382/224 |
| 7,453,439 B1 * | 11/2008 | Kushler et al. | ............... | 345/168 |
| 2001/0041328 A1 * | 11/2001 | Fisher | ............... | 434/157 |
| 2002/0054059 A1 * | 5/2002 | Schneiderman | ............... | 345/700 |
| 2003/0113017 A1 * | 6/2003 | Thomas et al. | ............... | 382/181 |
| 2003/0218611 A1 * | 11/2003 | Ben-Tovim et al. | ............... | 345/440 |
| 2004/0125150 A1 * | 7/2004 | Adcock et al. | ............... | 345/810 |
| 2005/0027448 A1 * | 2/2005 | Takenaga et al. | ............... | 701/211 |
| 2005/0068320 A1 * | 3/2005 | Jaeger | ............... | 345/440 |
| 2006/0018506 A1 * | 1/2006 | Rodriguez et al. | ............... | 382/100 |
| 2006/0217953 A1 * | 9/2006 | Parikh | ............... | 704/1 |
| 2007/0036371 A1 * | 2/2007 | Buil et al. | ............... | 381/312 |
| 2007/0162507 A1 * | 7/2007 | McGovern et al. | ............... | 707/104.1 |
| 2008/0046410 A1 * | 2/2008 | Lieb | ............... | 707/3 |
| 2008/0069480 A1 * | 3/2008 | Aarabi et al. | ............... | 382/305 |
| 2008/0189270 A1 * | 8/2008 | Takimoto et al. | ............... | 707/5 |
| 2008/0300872 A1 * | 12/2008 | Basu et al. | ............... | 704/235 |
| 2008/0316553 A1 * | 12/2008 | Tanaka et al. | ............... | 358/518 |
| 2009/0122086 A1 * | 5/2009 | Diederiks et al. | ............... | 345/690 |

FOREIGN PATENT DOCUMENTS

| | | |
|---|---|---|
| JP | 10-49542 A | 2/1998 |
| JP | 2002-215627 A | 8/2002 |
| JP | 2004-246454 A | 9/2004 |

* cited by examiner

*Primary Examiner* — Jeffrey Chow

(74) *Attorney, Agent, or Firm* — Birch, Stewart, Kolasch & Birch, LLP

(57) ABSTRACT

Keywords are appended to an image portion in one portion of a color image. In order to achieve this, a color bar is displayed on the color image, a color is designated by the position of a mark in the color bar, an image portion having the designated color is detected, a keyword table having keywords corresponding to the detected image portion is displayed, a desired keyword is selected from the displayed keyword table, and characters representing the selected keyword are displayed. Items of data representing the detected image portion, data representing the designated color and data representing the keyword are stored as metainformation in the image file of the color image.

10 Claims, 9 Drawing Sheets

METAINFORMATION ADD-ON APPARATUS, IMAGE REPRODUCING APPARATUS, METHODS OF CONTROLLING SAME AND PROGRAMS FOR CONTROLLING SAME

BACKGROUND OF THE INVENTION

1. Field of the Invention

This invention relates to an apparatus for adding on metainformation, an image reproducing apparatus, methods of controlling these and programs for controlling these.

2. Description of the Related Art

There are instances where various items of metainformation (attribute information) such as shooting date and photographer name are appended to an image. For example, there is prior art in which an area is extracted from an image and a feature obtained by analyzing the extracted area is added on as attribute information (see the specification of Japanese Patent Application Laid-Open No. 10-49542).

There is also prior art in which an image search is conducted with a sense of drawing a picture in cases where an image search key is created (see the specification of Japanese Patent Application Laid-Open No. 2002-215627).

There is also prior art in which footnote information that has been added to an image that is one portion of an image is displayed in easily understandable fashion (see the specification of Japanese Patent Application Laid-Open No. 2004-246454).

However, there are instances where adding on metainformation is troublesome.

SUMMARY OF THE INVENTION

Accordingly, an object of the present invention is to add on metainformation in comparatively simple fashion.

According to a first aspect of the present invention, the foregoing object is attained by providing an apparatus for adding on metainformation, the apparatus comprising: a first display control device for controlling a display device in such a manner that a color image represented by color image data is displayed on a display screen; a second display control device responsive to a metainformation registration command for controlling the display device in such a manner that a color bar in which multiple colors are arrayed is displayed on the color image displayed under control of the first display control device; a color designating device for designating one color from the color bar displayed under control of the second display control device; a third display control device for controlling the display device in such a manner that an image portion within the color image being displayed on the display screen and that corresponds to the color designated by the color designating device is displayed distinct from other portions of the color image, and in such a manner that keywords corresponding to the designated color are displayed; a keyword selecting device for selecting a desired keyword from among the keywords displayed under control of the third display control device; and a recording control device for recording data representing the keyword selected by the keyword selecting device and data representing the color corresponding to the color designated by the color designating device on a recording medium in association with color image data representing the color image displayed under control of the first control device.

The first aspect of the present invention also provides a control method suited to the above-described metainformation add-on apparatus. Specifically, the first aspect of the present invention provides a method of controlling an apparatus for adding on metainformation, the method comprising the steps of: controlling a display device by a first display control device in such a manner that color information represented by the color image data is displayed on a display screen; controlling the display device by a second display control device in response to a metainformation registration command for controlling the display device in such a manner that a color bar in which multiple colors are arrayed is displayed on the color image displayed under control of the first display control device; designating, by a color designating device, one color from the color bar displayed under control of the second display control device; controlling the display device by a third display control device in such a manner that an image portion within the color image being displayed on the display screen and that corresponds to the color designated by the color designating device is displayed distinct from other portions of the color image, and in such a manner that keywords corresponding to the designated color are displayed; selecting a desired keyword by a keyword selecting device from among keywords displayed under control of the third display control device; and recording, by a recording control device, data representing the keyword selected by the keyword selecting device and data representing the color corresponding to the color designated by the color designating device on a recording medium in association with color image data representing the color image displayed under control of the first control device.

The first aspect of the present invention also provides a program for executing the above-described method of controlling the metainformation add-on apparatus.

In accordance with the first aspect of the present invention, a color image is displayed on a display screen. If a metainformation registration command is applied, a color bar composed of an array of multiple colors also is displayed on the display screen. If a color is selected from the color bar, a portion of the displayed color image that has a color corresponding to the designated color is displayed distinct from other portions of the color image, and keywords corresponding to the designated color are displayed. A desired keyword is selected from among the displayed keywords. Data representing the selected keyword and data representing the color corresponding to the designated color are recorded on a recording medium in association with the color image data. Metainformation such as a keyword can be appended comparatively simply with regard to a portion of the color image having a specific color. In particular, keywords corresponding to the designated color are displayed and a desired color is selected from among these keywords. Since the displayed keywords are narrowed down by the designated color, it is unnecessary to select a desired keyword from a very large number of keywords. A keyword can be selected comparatively simply.

The recording control device records data, which represents the image portion having the color corresponding to the color designated by the color designating device, on the recording medium in association with the color image data.

The apparatus may further comprise a fourth display control device for controlling the display device in such a manner that text representing the color designated by the color designating device or the keyword selected by the keyword selecting device is displayed in close proximity to the image portion having the color corresponding to the color designated by the color designating device.

According to a second aspect of the present invention, the foregoing object is attained by provided an image reproducing apparatus comprising: a first display control device for controlling a display device so as to display a color image on a display screen, the color image being represented by color image data with which are associated data representing image portions having specific colors in the color image represented by the color image data, data representing the specific colors and data representing keyword of the image portions; a second display control device responsive to a metainformation call command for controlling the display device so as to display a color bar in which colors represented by the specific color data associated with the color image data are arrayed; a color designating device for designating one color from the color bar displayed under control of the second display control device; and a third display control device for controlling the display device so as to a display a keyword on the display screen based upon data representing the keyword of an image portion, which has the color designated by the color designating device, in the color image being displayed on the display screen.

The second aspect of the present invention also provides a control method suited to the above-described image reproducing apparatus. Specifically, the second aspect of the present invention provides a method of controlling an image reproducing apparatus, the method comprising the steps of: controlling a display device by a first display control device so as to display a color image on a display screen, the color image being represented by color image data with which are associated data representing image portions having specific colors in the color image represented by the color image data, data representing the specific colors and data representing keywords of the image portions; controlling the display device by a second display control device in response to a metainformation call command so as to display a color bar in which colors represented by the specific color data associated with the color image data are arrayed; designating, by a color designating device, one color from the color bar displayed under control of the second display control device; and controlling the display device by a third display control device so as to display a keyword on the display screen based upon data representing the keyword of an image portion, which has the color designated by the color designating device, in the color image being displayed on the display screen.

The second aspect of the present invention also provides a program for executing the above-described method of controlling the image reproducing apparatus.

In accordance with the second aspect of the present invention, a color image is displayed on a display screen. If a metainformation call command is applied, a color bar is displayed on the display screen, the color bar having an array of colors represented by specific color data that has been associated with color image data representing a color image. If one color is designated from the color bar, a keyword of an image portion having the designated color in the displayed color image is displayed. Which keywords have been appended to the color image can be determined.

The third display control device may display the image portion, which displays the keyword and has the color designated by the color designating device, distinct from other portions based upon data representing the image portions having the specific colors associated with the color image data.

The apparatus may further comprise a keyword designating device for designating a keyword being displayed under control of the third display device; a color image data reading device for reading color image data, which has the keyword designated by the keyword designating device, from a recording medium; and a fourth display control device for controlling the display device in such a manner that a color image represented by the color image data that has been read by the color image data reading device is displayed on the display screen.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the drawings.

Figure 1:
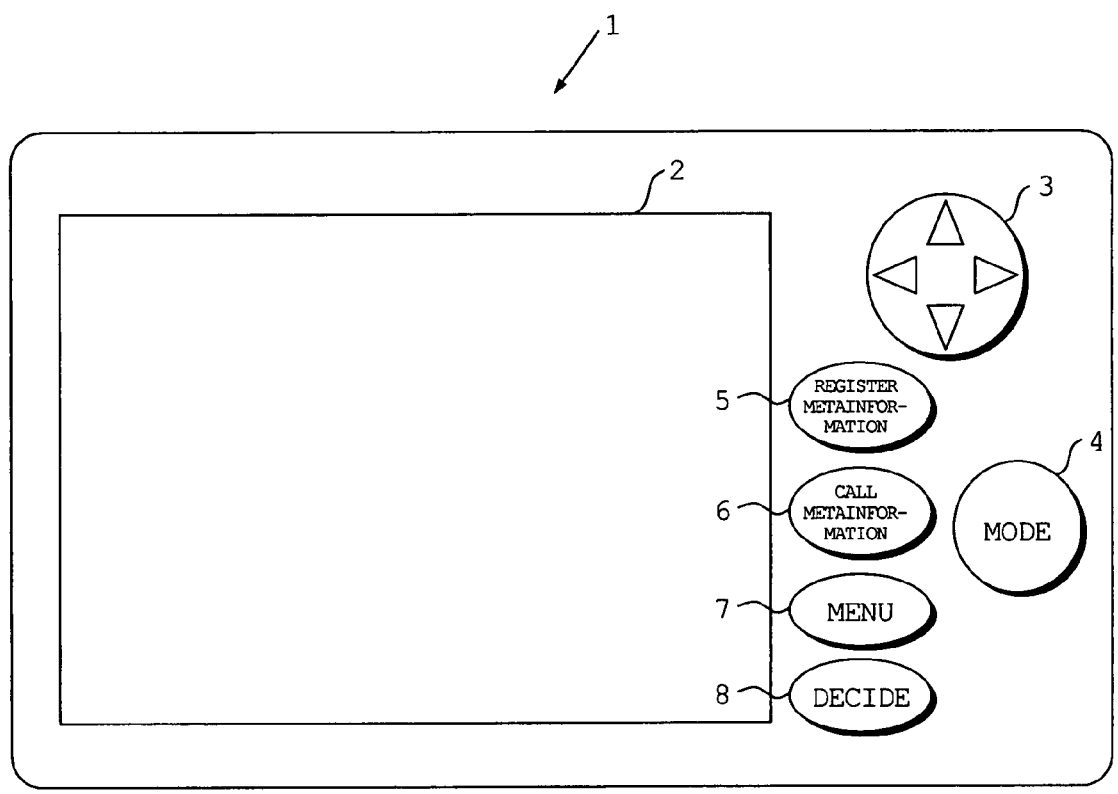
FIG. 1 is a diagram illustrating the back of a digital still camera.

FIG. 1 is a diagram illustrating the back of a digital still camera 1 according to an embodiment of the present invention.

The back of the digital still camera 1 is formed to have a display screen 2 substantially over the entirety thereof. Provided at the upper right of the display screen 2 is a so-called cross-hair key 3 formed to have up, down, left, right arrows that are capable of being pressed. A mode dial 4 is provided below the cross-hair key 3. Modes such as an image sensing mode, playback mode and transmit mode can be set by the mode dial 4.

Provided on the right side of the display screen 2 are a metainformation registration button 5, a metainformation call button 6, a menu button 7 and a decide button 8. The metainformation registration button 5 is a button pressed by the user when metainformation is registered in an image, as will be described later. The metainformation call button 6 is a button pressed by the user when looking for another image that utilizes metainformation that has been registered in an image. The menu button 7 is a button pressed by the user when an operation utilizing a menu is performed. The decide button 8 is a button pressed by the user when a decide command is applied to the digital still camera 1.

Figure 2:
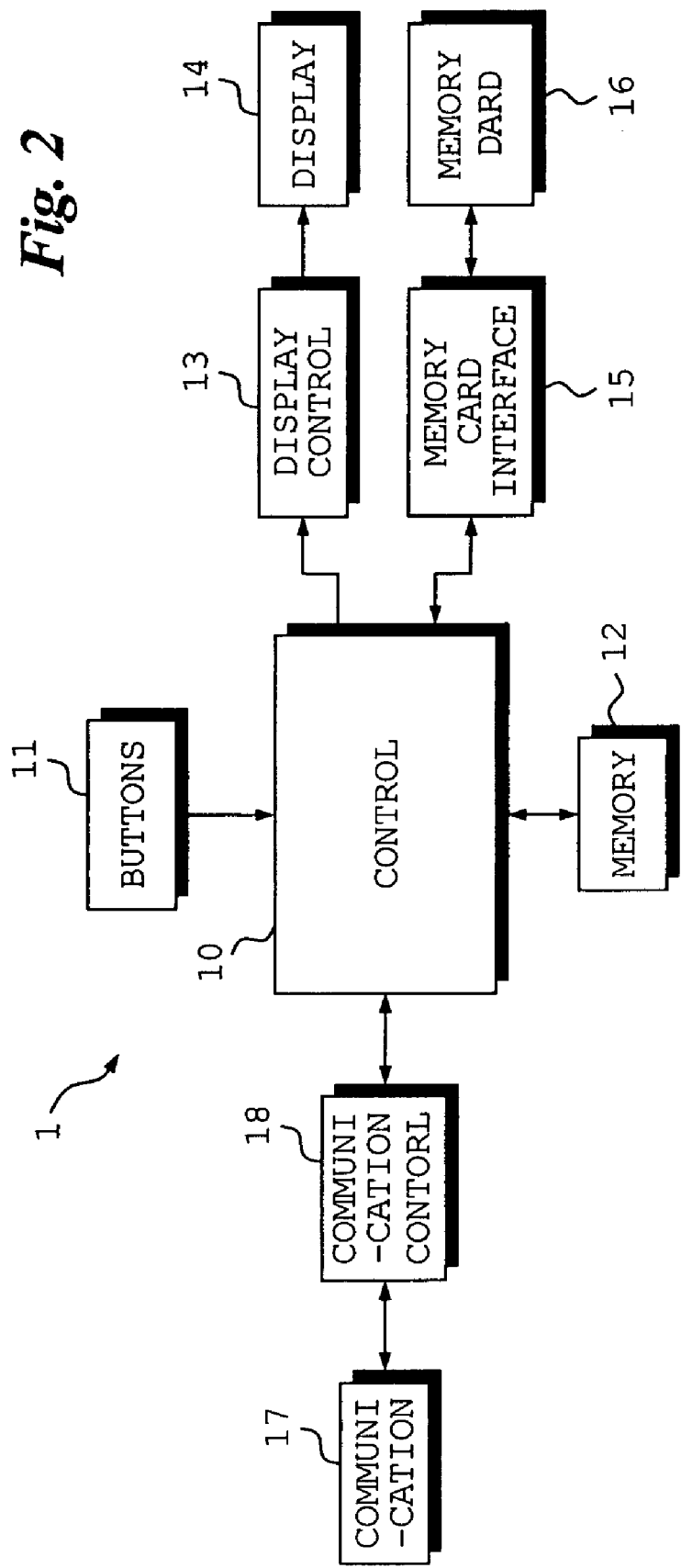
FIG. 2 is a block diagram illustrating the electrical structure of the digital still camera.

FIG. 2 is a block diagram illustrating a portion of the electrical structure of the digital still camera 1. In this embodiment, processing utilizing the playback mode is executed and therefore the block diagram illustrated relates to playback (an image sensing block is not illustrated).

The overall operation of the digital still camera 1 is controlled by a control circuit 10.

Output signals from the aforementioned cross-hair key 3 and mode dial 4, in addition to a signal from a shutter-release button (not shown), are input to the control circuit 10. Connected to the control circuit 10 is a memory 12 for temporarily storing data. The memory 12 also stores prescribed data and an operating program, etc.

If the playback mode is set, an image file that has been recorded on a memory card 16 is read and the image file is input to the control circuit 10 via a memory card interface 15.

If image data that has been recorded in an image-data recording area of the image file is applied to a display control circuit 13, a display unit 14 is controlled by the display control circuit 13 and the image represented by this image data is displayed on the display screen.

If the transmit mode is set, the image file that has been read from the memory card 16 as described above is input to a communication control circuit 18 via the memory card interface 15 and control circuit 10. A communication circuit 17 is controlled by the communication control circuit 18, whereby the image file that has been read from the memory card 16 is transmitted to another digital still camera, etc. The digital still camera 1 is also capable of receiving an image file that has been transmitted from another digital still camera. The image file that has been transmitted from the other digital still camera is received by the communication circuit 17 and is applied to and recorded on the memory card 16 via the communication control circuit 18, control circuit 10 and memory card interface 15.

A program for controlling an operation, described later can also be received from the communication circuit 17. The program received by the communication circuit 17 is applied to and stored in the memory 12 via the communication control circuit 18 and control circuit 10. The digital still camera 1 is capable of performing an operation, described below, in accordance with the operating program stored in the memory 12.

Figure 3:
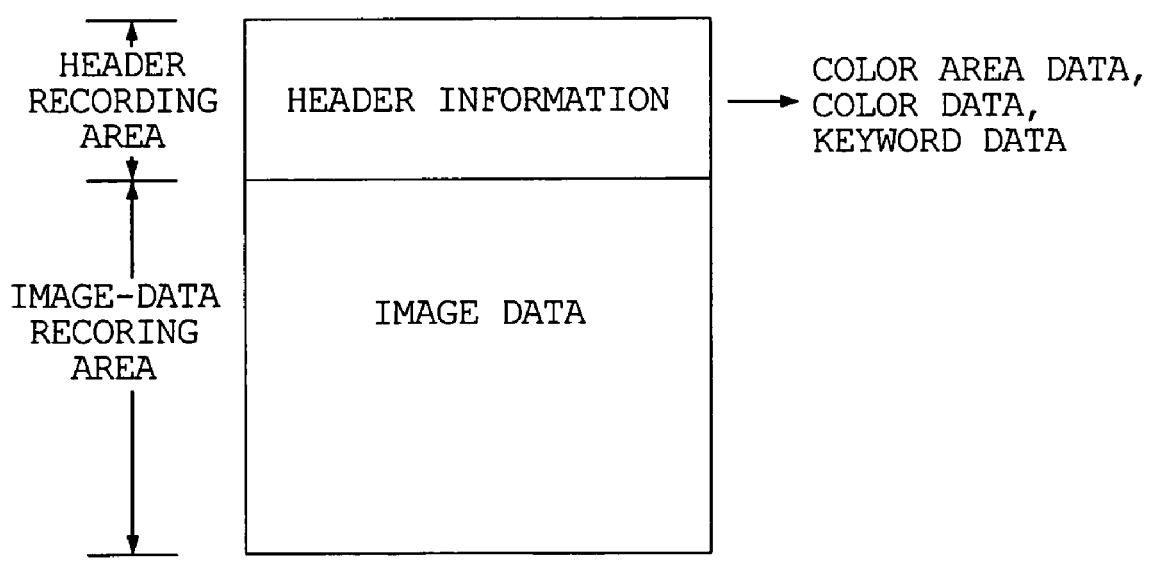
FIG. 3 illustrates the file structure of an image file.

FIG. 3 illustrates the file structure (data structure) of an image file.

The image file includes a header recording area and an image-data recording area.

Image data has been recorded in the image-data recording area.

Header information such as image-file management data has been recorded in the header recording area. In particular, in the digital still camera according to this embodiment, keywords serving as metainformation can be appended with regard to an area having a desired color from within a color image represented by color image data, as will be described later. Data representing these keywords, data representing the area having this color (it will suffice if the area can be specified) and data representing the color are also recorded in the header recording area.

Figure 4:
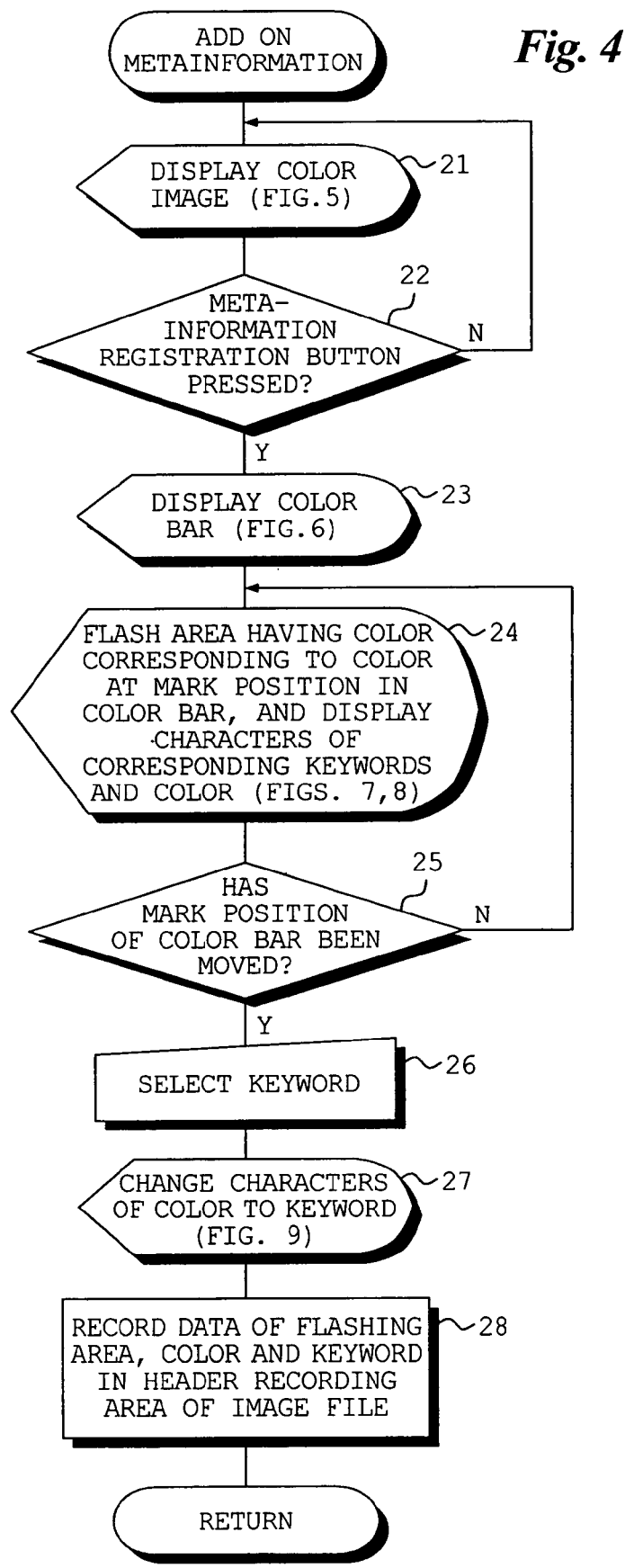
FIG. 4 is a flowchart illustrating processing for adding on metainformation.

FIG. 4 is a flowchart illustrating processing for adding on metainformation. FIGS. 5 to 9 illustrate examples of images displayed on a display screen.

Figure 5:
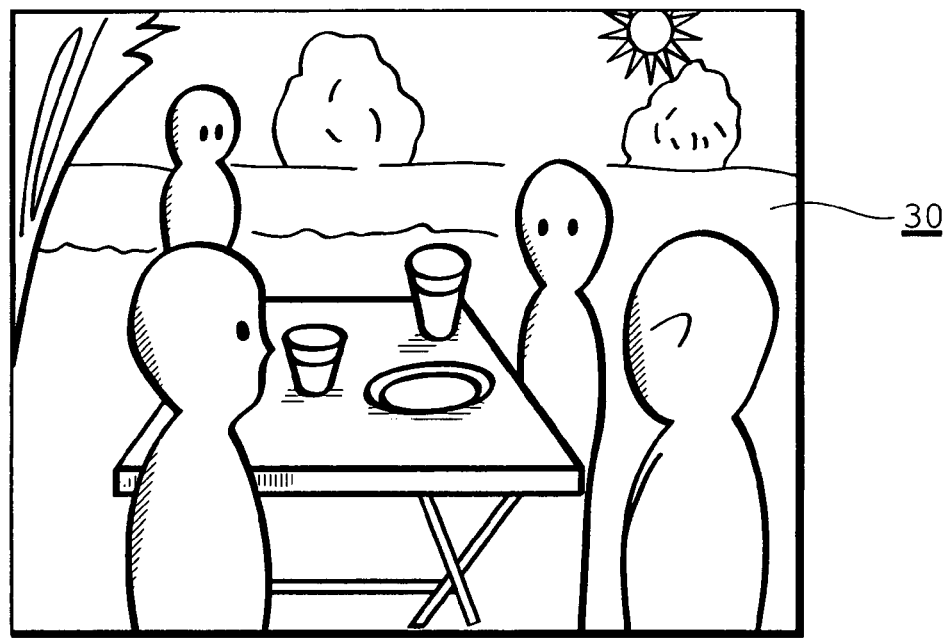
FIGS. 5 to 9 illustrate examples of color images.

A desired image file is read from among a number of image files that have been stored on the memory card 16. When this is done, a color image 30 represented by the read image file is displayed on the display screen 2 (step 21), as illustrated in FIG. 5.

When metainformation concerning the color image 30 being displayed on the display screen 2 is registered, the metainformation registration button 5 is pressed ("YES" at step 22), whereupon a color bar is displayed at the bottom of the display screen 2 (step 23).

Figure 6:
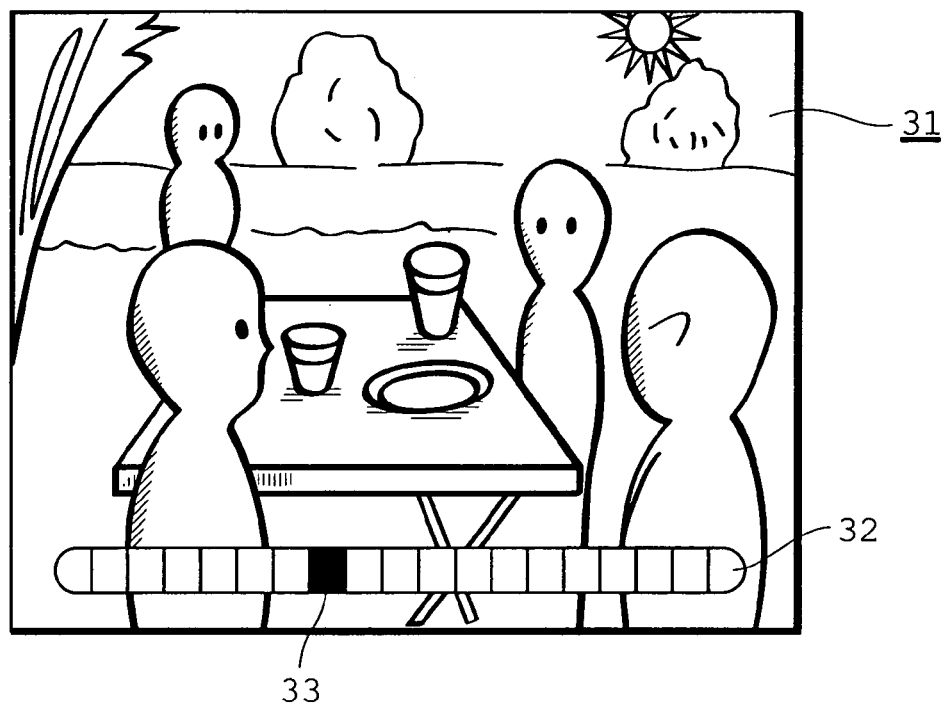

FIG. 6 illustrates an example of a color image 31 on which a color bar is being displayed.

Specifically, a horizontally extending color bar 32 is being displayed at the bottom of the color image 31. The color bar 32 is a gradation display of an array of ten colors (the number of colors need not necessarily be ten and may be larger or smaller than this number) that differ at prescribed intervals along the horizontal direction. The display need not necessarily be a gradation display and may simply be a display of colors that differ at prescribed intervals.

A mark 33 that is moved to the left and right in the color bar 32 in conformity with depression of the left and right arrows of the cross-hair key 3 is being displayed in the color bar 32. The user can designate a color by the position of the mark 33 in the color bar 32.

With reference again to FIG. 4, the position of the mark 33 in the color bar 32 is detected. An area having the color specified by the position of the mark 33 is caused to flash in the color image being displayed. Further, characters representing the keywords and the color that correspond to the color are displayed (step 24).

Figure 7:
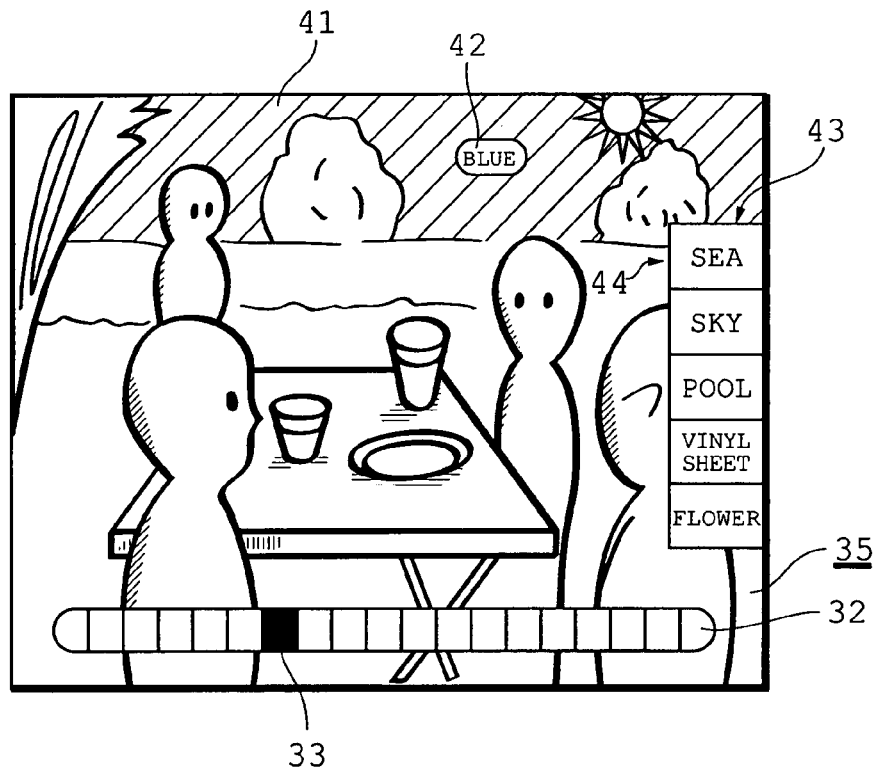

FIG. 7 illustrates an example of a color image on which keywords, etc., are being displayed.

The color bar 32 is being displayed at the bottom of a color image 35 in the manner described above. Here it is assumed that the mark 33 in the color bar 32 is situated at a blue-color portion of the color bar 32. This means that the color blue has been designated, and at this time a keyword table 43 that includes keywords corresponding to the color blue is displayed on the right side of the color image 35. The keywords include "SEA", "SKY", "POOL", "VINYL SHEET" and "FLOWER", etc. An arrow symbol 44 for designating a keyword is being displayed on the left side of the keyword table 43. The arrow symbol 44 is moved up and down between keywords in accordance with depression of the up and down arrows of cross-hair key 3. The upper part of the color image 35 includes an image portion 41 of blue sky. The sky image portion 41 flashes as the image portion having the color designated by the mark 33 (flashing is indicated by the hatching in FIG. 7). Of course, instead of causing this portion to flash, the portion may be made darker or brighter than other portions so as to make it distinguishable from the other portions. Furthermore, characters 42 reading "BLUE" are being displayed in the sky image portion 41. The user can determine that the color blue has been designated by observing the characters 42 reading "BLUE", that the blue image portion 41 is flashing in the color image 35, and that the keyword table 43 being displayed relates to the color blue.

With reference again to FIG. 5, if the mark 33 in the color bar 32 is moved ("YES" at step 25), the image portion having the color designated by the position to which the mark 33 has been moved flashes, and the characters representing this color and the keywords corresponding to this color are displayed on the color image (step 24).

Figure 8:
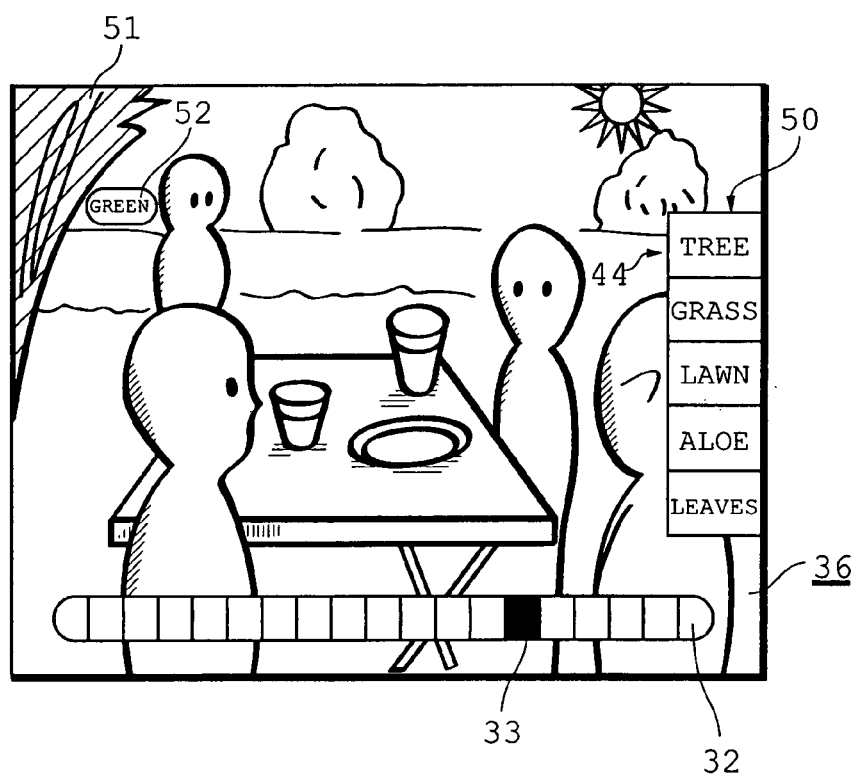

FIG. 8 illustrates an example of a color image 36 in which the mark 33 has been moved.

Here it is assumed that the mark 33 has been moved so as to designate a portion having the color green. When this is done, a keyword table 50 containing keywords regarding the color green is displayed on the right side of the color image 36. Further, a green-color image portion 51 flashes and characters 52 reading "GREEN" are displayed.

With reference again to FIG. 4, a keyword is selected by the user (step 25). If the decide button 8 is then pressed, then the keyword being designated by the arrow symbol 44 at depression of the decide button 8 is selected. When the keyword is selected, the characters representing the color that has been specified by the mark change to the characters of the keyword (step 27).

Figure 9:
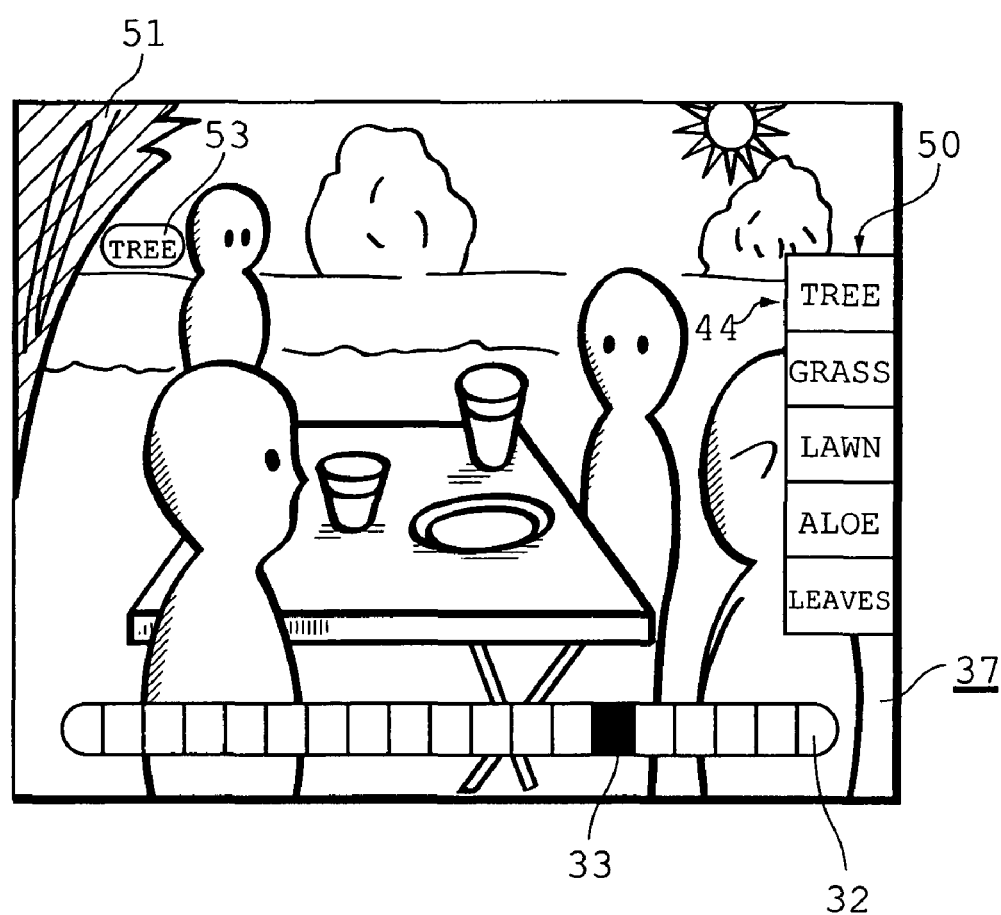

FIG. 9 illustrates an example of a color image in which characters representing a color have changed.

A keyword reading "TREE" in the keyword table 50 is being designated by the arrow symbol 44. If the decide button 8 is pressed, the keyword "TREE" being designated by the arrow symbol 44 is decided upon as the keyword of the image portion 51. When this is done, characters 53 reading "TREE" appear instead of the characters 52 (FIG. 8) representing color. Thus the user can tell that the keyword "TREE" has been added on with regard to the image portion 51.

With reference again to FIG. 4, when a keyword is decided, data representing the flashing area, data concerning the color and data representing the keyword are recorded in the header recording area of the image file containing the image data representing the color image being displayed (step 28).

Thus, with regard to a color image, metainformation, namely a keyword and a color, is appended in regard to a portion having a desired color in the color image. It goes without saying that it can be so arranged that metainformation is added to the header recording area in similar fashion with regard to other colors as well and not just one color.

Figure 10:
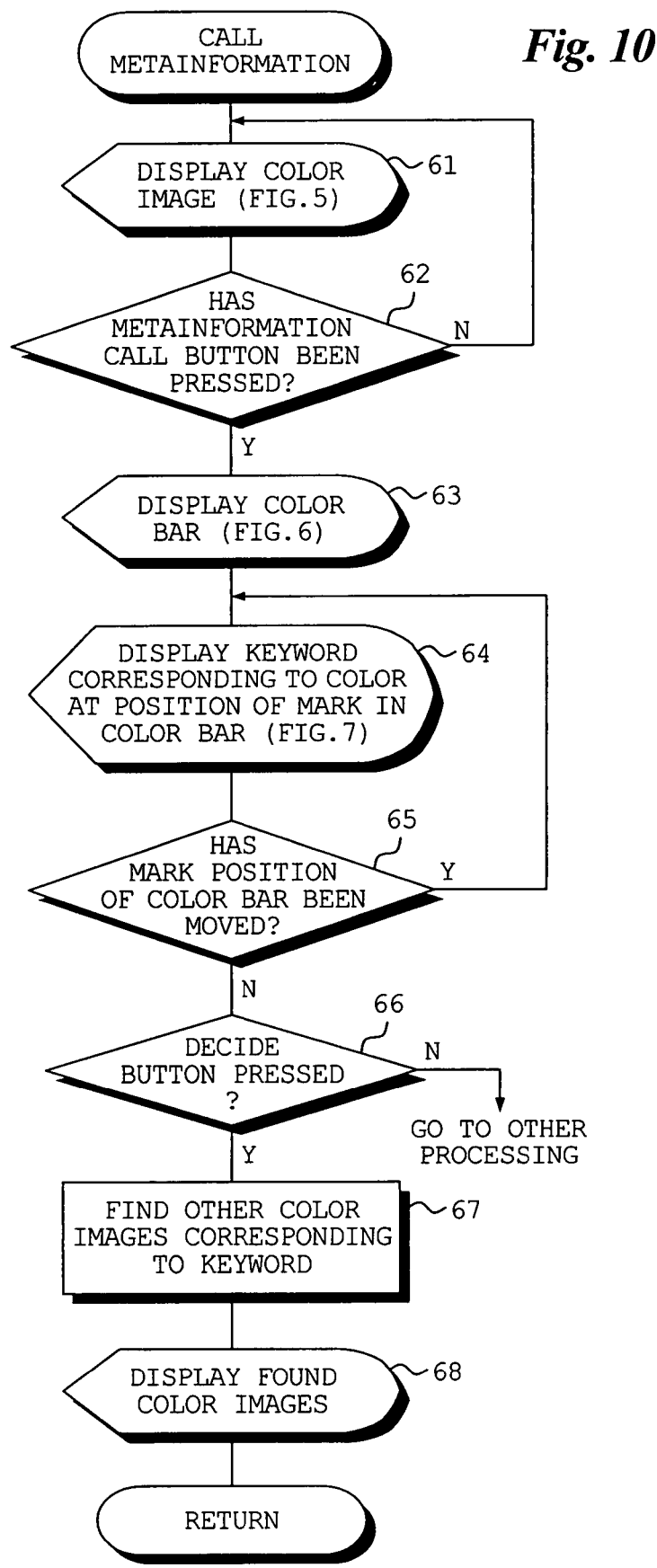
FIG. 10 is a flowchart illustrating processing for calling metainformation.
Figure 11:
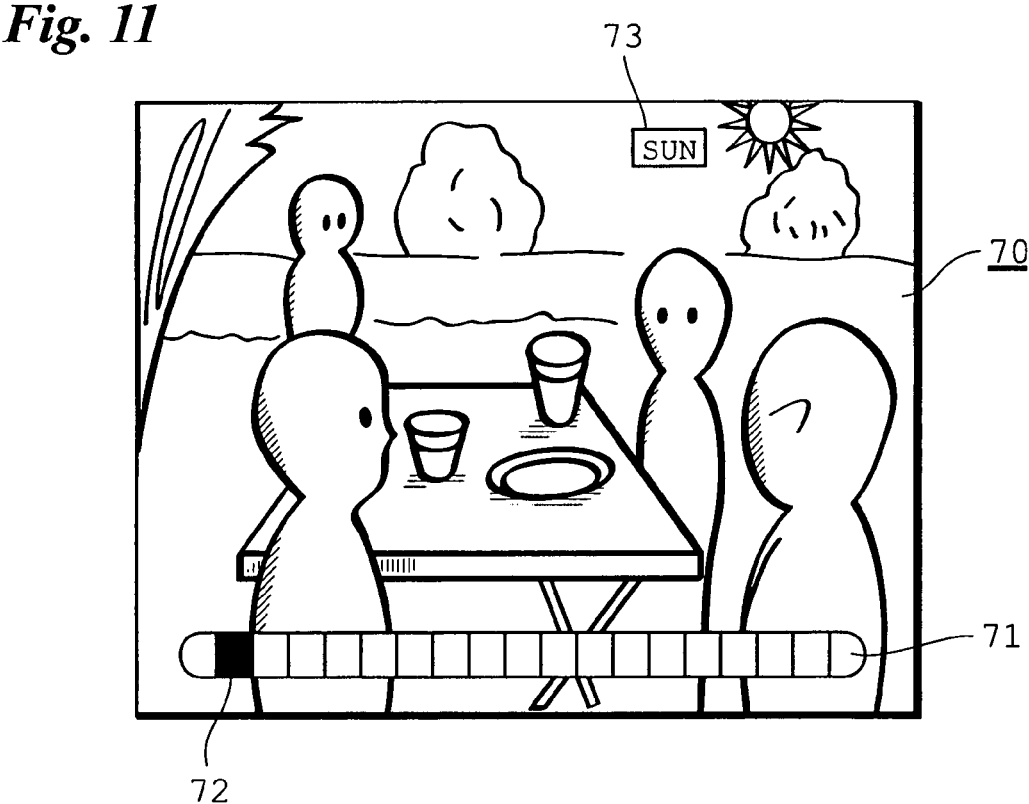
FIGS. 11 and 12 illustrate examples of color images.
Figure 12:
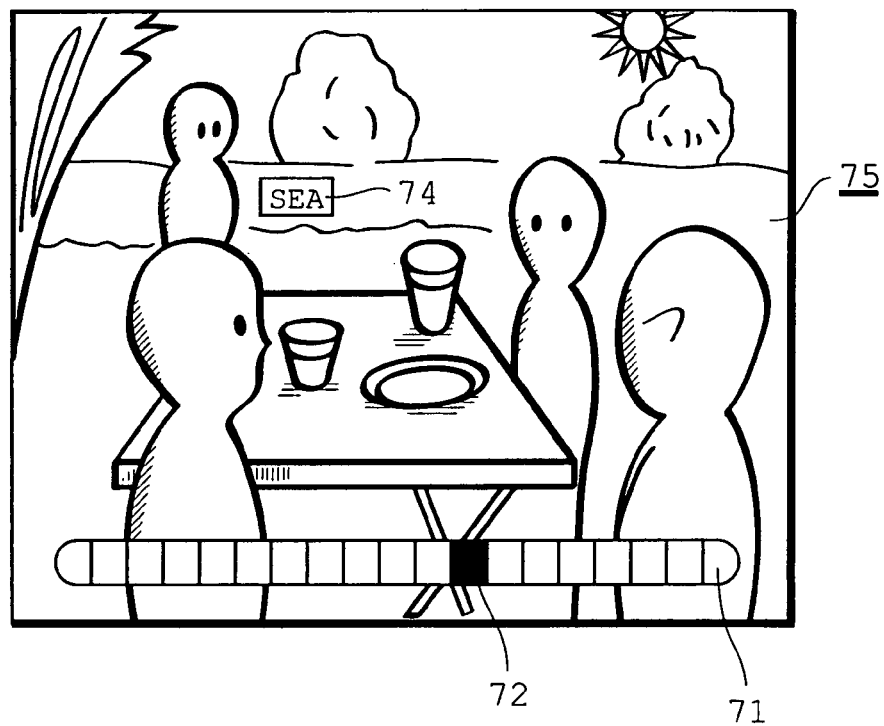

FIG. 10 is a flowchart illustrating processing for calling metainformation, and FIGS. 11 and 12 illustrate examples of color images.

The color image is displayed on a display screen in a manner similar to that of the processing for adding on metainformation (step 61) (see FIG. 5). If the metainformation call button 6 is pressed ("YES" at step 62), a color bar is displayed at the bottom of the color image in a manner similar to that of processing for adding on metainformation (step 63) (see FIG. 6).

The position of the mark in the color bar is detected and a keyword corresponding to the color decided by the position of the mark is read from the image file representing the color image being displayed. The read keyword is displayed (step 64).

FIG. 11 illustrates an example of a color image on which a keyword is being displayed.

A color bar 71 is being displayed at the bottom of a color image 70. A mark 72 for designating a color within the color bar 71 also is being displayed in the color bar 71. The color bar 71 is capable of designating a color represented by color data that has been recorded in the header recording area in processing for adding on metainformation in the manner described above. For example, assume a case where color data that has been added on in conformity with a color image in metainformation add-on processing is the color red, the color blue, the color green, the color white, the color black, the color gray and the color yellow. In this case, if the color image 70 contains colors other than the colors mentioned, these other colors will not be displayed in the color bar 71. It goes without saying that it may be so arranged that these other colors are displayed.

Keyword data corresponding to the color (e.g., red) designated by the mark 72 of the color bar 71 is read from the header recording area and a keyword 73 (characters reading "SUN") represented by the read keyword data is displayed on the color image 70. The keyword 73 is displayed in the vicinity of the image portion to which the keyword has been appended in the manner described above. For example, if the portion of the image that is the sun has been specified as the image portion, then the characters reading "SUN" are displayed as the keyword in the vicinity of the portion of the image that is the sun.

With reference again to FIG. 10, if the position of the mark 72 in the color bar 71 is moved ("YES" at step 65), then the keyword that corresponds to the color at the position to which the mark 72 has been moved is displayed (step 64).

FIG. 12 illustrates an example of a color image.

Here it is assumed that the mark 72 of the color bar 71 has been moved from the portion of the red color to the portion of the color of water. Further, it is assumed that for a color image 75, "SEA" has been recorded as the keyword in correspondence with the color of water. Accordingly, the characters 73 reading "SUN" that were being displayed in FIG. 11 gradually become dimmer and disappear and the keyword of characters 74 reading "SEA" gradually appears.

With reference again to FIG. 10, if the decide button 8 is pressed ("YES" at step 66), then the keyword that was being displayed when the decide button 8 was pressed becomes the keyword for a search. Image files having the search keyword are found from other image files that have been recorded on the memory card 16 (step 67). Color images represented by the image files that have been found are displayed on the display screen (step 68). Images having the desired keyword can thus be found.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for adding on metainformation, comprising:
   a first display control device for controlling a display device in such a manner that a color image represented by color image data is displayed on a display screen;
   a second display control device responsive to a metainformation registration command for controlling the display device in such a manner that a color bar in which multiple colors are arrayed is displayed on the color image displayed under control of said first display control device;
   a color designating device for designating one color from the color bar displayed under control of said second display control device;
   a third display control device for controlling the display device in such a manner that an image portion within the color image being displayed on the display screen and that corresponds to the color designated by said color designating device is displayed distinct from other portions of the color image, and in such a manner that only object names corresponding to objects having the designated color are displayed;
   an object name selecting device for selecting a desired object name from among the object names displayed under control of said third display control device; and
   a recording control device for recording data representing the object name selected by said object name selecting device and data representing the color corresponding to the color designated by said color designating device on a recording medium in association with color image data representing the color image displayed under control of said first control device.

2. The apparatus according to claim 1, wherein said recording control device records data, which represents the image portion having the color corresponding to the color designated by said color designating device, on the recording medium in association with the color image data.

3. The apparatus according to claim 1, further comprising a fourth display control device for controlling the display device in such a manner that text representing the color designated by said color designating device or the object name selected by said object name selecting device is displayed in close proximity to the image portion having the color corresponding to the color designated by said color designating device.

4. An image reproducing apparatus comprising:
   a first display control device for controlling a display device so as to display a color image on a display screen, wherein the color image is represented by color image data associated with data representing image portions having specific colors in the color image represented by the color image data, data representing the specific colors, and data representing object names of the image portions;

a second display control device responsive to a metainformation call command for controlling the display device so as to display a color bar in which colors represented by the specific color data associated with the color image data are arrayed;

a color designating device for designating one color from the color bar displayed under control of said second display control device; and a third display control device for controlling the display device so as to a display an object name on the display screen based upon data representing the object name of an image portion, which has the color designated by said color designating device, in the color image being displayed on the display screen, wherein only object names of the image portion having the designated color are displayed.

5. The apparatus according to claim 4, wherein said third display control device displays the image portion, which displays the object name and has the color designated by said color designating device, in a manner distinct from other portions based upon data representing the image portions having the specific colors associated with the color image data.

6. The apparatus according to claim 4, further comprising:
an object name designating device for designating an object name being displayed under control of said third display control device;
a color image data reading device for reading color image data, which has the object name designated by said object name designating device, from a recording medium; and
a fourth display control device for controlling the display device in such a manner that a color image represented by the color image data read from said color image data reading device is displayed on the display screen.

7. A method of controlling an apparatus for adding on metainformation, comprising the steps of:
controlling a display device by a first display control device in such a manner that color information represented by the color image data is displayed on a display screen;
controlling the display device by a second display control device in response to a metainformation registration command for controlling the display device in such a manner that a color bar in which multiple colors are arrayed is displayed on the color image displayed under control of the first display control device;
designating, by a color designating device, one color from the color bar displayed under control of the second display control device;
controlling the display device by a third display control device in such a manner that an image portion within the color image being displayed on the display screen and that corresponds to the color designated by the color designating device is displayed distinct from other portions of the color image, and in such a manner that only object names corresponding to objects having the designated color are displayed;
selecting a desired object name by an object name selecting device from among object names displayed under control of the third display control device; and
recording, by a recording control device, data representing the object name selected by the object name selecting device and data representing the color corresponding to the color designated by the color designating device on a recording medium in association with color image data representing the color image displayed under control of the first control device.

8. A method of controlling an image reproducing apparatus, comprising the steps of:
controlling a display device by a first display control device so as to display a color image on a display screen, wherein the color image is represented by color image data associated with data representing image portions having specific colors in the color image represented by the color image data, data representing the specific colors, and data representing object names of the image portions;
controlling the display device by a second display control device in response to a metainformation call command so as to display a color bar in which colors represented by the specific color data associated with the color image data are arrayed;
designating, by a color designating device, one color from the color bar displayed under control of the second display control device; and
controlling the display device by a third display control device so as to display an object name on the display screen based upon data representing the object name of an image portion, which has the color designated by the color designating device, in the color image being displayed on the display screen, wherein only object names of the image portion having the designated color are displayed.

9. A non-transitory computer-readable medium storing a program for causing a computer of an apparatus for adding on metainformation to execute the following steps:
performing first display control for controlling a display device in such a manner that a color image represented by color image data is displayed on a display screen;
performing second display control responsive to a metainformation registration command for controlling the display device in such a manner that a color bar in which multiple colors are arrayed is displayed on the color image displayed under control of said first display control;
designating one color from the color bar displayed under control of said second display control;
performing third display control for controlling the display device in such a manner that an image portion within the color image being displayed on the display screen and that corresponds to the color designated is displayed distinct from other portions of the color image, and in such a manner that only object names corresponding to objects having the designated color are displayed;
selecting a desired object name from among the object names displayed under control of said third display control; and
recording data representing the object name selected and data representing the color corresponding to the color designated on a recording medium in association with color image data representing the color image displayed under control of said first control.

10. A non-transitory computer-readable medium storing a program for causing a computer of an image reproducing apparatus to execute the following steps:
performing first display control for controlling a display device so as to display a color image on a display screen, the color image being represented by color image data with which are associated data representing image portions having specific colors in the color image represented by the color image data, data representing the specific colors and data representing object names of the image portions;

performing second display control responsive to a metainformation call command for controlling the display device so as to display a color bar in which colors represented by the specific color data associated with the color image data are arrayed;

designating one color from the color bar displayed under control of said second display control; and performing third display control for controlling the display device so as to a display an object name on the display screen based upon data representing the object name of an image portion, which has the color designated, in the color image being displayed on the display screen, wherein only object names of the image portion having the designated color are displayed.

\* \* \* \* \*